2,843,468
Patented July 15, 1958

2,843,468

STABILIZED HYDROCARBON COMPOSITIONS AND ANTIOXIDANT THEREFOR

John W. Thompson and Wayne V. McConnell, Kingsport, Tenn., assignors to Eastman Kodak Company, Rochester, N. Y., a corporation of New Jersey No Drawing. Application July 22, 1954
Serial No. 445,157

11 Claims. (Cl. 44—74)

This invention relates to the stabilization against oxidation of hydrocarbon compositions normally subject to oxidation and to new and improved antioxidants.

Many organic compositions, and particularly hydrocarbon compositions, are subject to deleterious oxidation during storage or use. Thus, for example, the petroleum derivatives such as gasolines, oils, and the like, as well as such materials as both natural and synthetic rubber, generally have to be stabilized against oxidation for satisfactory results. In the case of the petroleum products, and particularly the gasolines such as straight-run gasoline, thermal or catalytically cracked gasolines, leaded gasolines such as aviation fuel, jet fuels, and the like, undesirable soluble and insoluble gums form due to oxidation.

It is accordingly an object of this invention to provide new and useful antioxidants which are of particular utility in stabilizing oxidizable hydrocarbon compositions against the objectionable effect of oxidation.

It is another object of this invention to provide improved antioxidants which are normally liquid, and which are readily soluble in petroleum products.

Another object of the invention is to improve petroleum fuels by incorporating therein a new and highly effective antioxidant capable of reducing gum formation to an unobjectionable level.

Other objects will be apparent from the description and the claims which follow.

These and other objects are attained by means of this invention, which comprises stabilizing a normally oxidizable hydrocarbon such as a petroleum derivative or rubber by incorporating therein a stabilizing amount of a $N^1,N^3,N^5$-trialkyl-1,3,5-benzenetriamine in which the alkyl groups contain 1–8 carbon atoms.

These materials thus have the formula

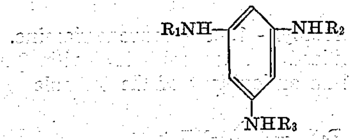

in which $R_1$, $R_2$ and $R_3$ are the same or different alkyl groups. The alkyl groups can be either straight or branched chain groups, with the branched alkyl radicals giving particularly advantageous results. The antioxidants of this invention give effective stabilization over a wide range of concentrations, although concentrations of 0.001% to 1.0% are preferably employed for practical purposes. Larger amounts, such as up to 5% or even 10% by weight based on the weight of the material being stabilized, can be employed with excellent results, although such higher concentrations are not necessary for effective stabilization. Thus the amount used is usually limited by economic factors rather than by the effectiveness of stabilization.

The antioxidants embodying this invention can be readily prepared by reacting phloroglucinol with the appropriate alkyl amine at elevated temperatures whereby the alkyl amine replaces the hydroxy groups on the benzene nucleus. In the preparation of the compounds embodying this invention, 0.15 mole of phloroglucinol dihydrate and 0.9 mole of an alkyl amine in admixture were heated for 15 hours in an autoclave at 200° C. The excess amine was then removed by distilling under reduced pressure, followed by distillation of the residue to give the antioxidant. This procedure can be used successfully for preparing any of the antioxidants of this invention such as $N^1,N^3,N^5$-trimethyl-1,3,5-benzenetriamine which has a boiling point of 155° C. at pressures below 0.1 mm., $N^1,N^3,N^5$-tris(n-butyl)-1,3,5-benzenetriamine, which is a brown oil boiling at 190–199° C. at 0.1 mm. pressure, $N^1,N^3,N^5$-tris(sec-butyl)-1,3,5-benzenetriamine boiling at 160° C. at 0.1 mm. pressure, and $N^1,N^3,N^5$-tris(2-ethylhexyl)-1,3,5-benzenetriamine boiling at 170–193° C. at 0.05 to 0.10 mm. pressure. The other antioxidants as defined herein wherein the alkyl groups are the same or different groups and contain 1 to 8 carbon atoms are readily prepared in similar fashion. In the preparation of the various triamines embodying the invention, the amine employed will determine the final product obtained. Thus, for example, methylamine gives the corresponding $N^1,N^3,N^5$-tri(methylamino) compound, and the reaction can be readily carried out in aqueous solution. In the preparation of the compounds set out above, n-butyl amine, sec-butyl amine and 2-ethylhexyl amine were employed to give the corresponding benzenetriamines. As will appear more fully hereinafter, any of the benzenetriamines wherein the N-alkyl groups contain from 1 to 8 carbon atoms can be employed in practicing the invention. The antioxidants in which the alkyl groups contain from 3 to 5 carbon atoms are particularly active, although any of the other compounds can be used with excellent results. The branched chain alkyl groups appear to give compounds having a slightly higher degree of antioxidant activity than the compounds in which the alkyl groups have a straight chain. Not only do the antioxidants embodying the invention have a high degree of activity, but they possess the further advantages of being oils, and of being readily blended into hydrocarbons such as the petroleum derivatives. The normally liquid character of the antioxidants of this invention removes the possibility of the antioxidant crystallizing from the substrate being stabilized. In this regard, the trialkyl benzenetriamines offer advantages over the triaryl benzenetriamines which are also effective antioxidants.

The subject stabilizers are compatible with and can be employed in conjunction with other types of common additives such as dyes, metal deactivators, tetraethyllead fluid, and synergists.

The high degree of antioxidant activity of various materials embodying this invention in a variety of hydrocarbon compositions is illustrated by the following examples of preferred embodiments thereof. Similar results are obtained with any of the other trialkyl benzenetriamines as defined herein with these or other normally oxidizable hydrocarbon compositions.

EXAMPLE 1

The cracked gasolines are a typical example of hydrocarbon materials which are deleteriously affected by oxidation. In Table 1, typical results are shown for the stabilization of a Pennsylvania blend of catalytic and thermal stocks. The ability of the antioxidants to increase the induction period of this representative cracked gasoline was determined by the oxygen bomb stability test described in Industrial and Engineering Chemistry, 24, 1375 (1932). The concentration of 26 lbs. of antioxidant in 1000 bbl. of gasoline represents an antioxidant concentration of approximately 0.01%. As can be seen from the table, the induction period at such concentrations was increased from 350% to more than 500% over the induction period for the same gasoline containing no added antioxidant.

*Table 1.—Antioxidant potency in cracked gasoline*

| Antioxidant | Concn. in Gasoline, lb./1,000 bbl. | Induction period, Min. |
|---|---|---|
| None | None | 100 |
| $N^1,N^3,N^5$-trimethyl-1,3,5-benzenetriamine | 26 | 350 |
| $N^1,N^3,N^5$-tris(n-butyl)-1,3,5-benzenetriamine | 26 | 427 |
| $N^1,N^3,N^5$-tris(sec-butyl)-1,3,5-benzenetriamine | 26 | 530 |
| $N^1,N^3,N^5$-tris(2-ethylhexyl)-1,3,5-benzenetriamine | 26 | 385 |

EXAMPLE 2

Leaded aviation gasolines are subject to oxidative deterioration which results in the formation of both soluble and insoluble gums. In such fuels, stabilization of both the tetraethyllead and the hydrocarbon is required, since elements from both have been found in the deterioration products. The improved results obtained using the antioxidants of this invention in a typical leaded aviation gasoline are shown in Table 2. The degree of stabilization was determined by the accelerated stability test commonly referred to as the "16-hour accelerated gum" test. In this procedure, 200-ml. samples of gasoline in glass bottles are exposed in stainless steel bombs to 100 p. s. i. of oxygen for 16 hours at 212° F. After cooling, the content of soluble gum and insoluble gum is determined, and the sum of these two values is designated accelerated gum. The gasoline employed in the tests shown in Table 2 was a commercial 115–145 octane fuel containing 4.6 ml. of tetraethyllead per gallon. As can be seen from the data set out in Table 2, the antioxidants of this invention reduce the content of both soluble and insoluble gum many fold.

*Table 2.—Antioxidant potency in aviation gasoline*

| Antioxidant | Concn. in Gasoline, lb./1,000 bbl. | 16-Hr., Accelerated Gum, mg./100 ml. | |
|---|---|---|---|
| | | Sol. | Insol. |
| None | None | 41.0 | 67.9 |
| $N^1,N^3,N^5$-trimethyl-1,3,5-benzenetriamine | 16 | 4.3 | 1.8 |
| $N^1,N^3,N^5$-tris(sec-butyl)-1,3,5-benzenetriamine | 16 | 2.0 | 0.0 |
| $N^1,N^3,N^5$-tris(2-ethylhexyl)-1,3,5-benzenetriamine | 16 | 4.1 | 0.0 |

EXAMPLE 3

Jet engine fuels contain no tetraethyllead but suffer from oxidative deterioration which results in the formation of soluble and insoluble gums. The jet fuel stability is commonly determined by an accelerated gum test, similar to the 16-hour accelerated gum test described in the preceding example, except that a higher evaporation temperature is used in determining the soluble gum in jet fuel. In Table 3 the data are set out showing the utility of the antioxidants of this invention in stabilizing a jet fuel comprising a blend of catalytic, thermal and straight-run gasolines plus naphtha. As can be seen from Table 3, the total quantity of gum formed in an unstabilized jet fuel amounted to 412 mg. per 100 ml. whereas the stabilized compositions containing less than 0.01% of antioxidant had total gum contents in the range of 16–35 mg. per 100 ml.

*Table 3.—Antioxidant potency in jet fuel*

| Antioxidant | Concn. in Jet Fuel, lb./1,000 bbl. | 16-Hr. Accelerated Gum, mg./100 ml. | |
|---|---|---|---|
| | | Sol. | Insol. |
| None | None | 411.6 | 0.4 |
| $N^1,N^3,N^5$-trimethyl-1,3,5-benzenetriamine | 16 | 18.8 | 2.5 |
| $N^1,N^3,N^5$-tris(sec-butyl)-1,3,5-benzenetriamine | 16 | 16.2 | 0.4 |
| $N^1,N^3,N^5$-tris(2-ethylhexyl)-1,3,5-benzenetriamine | 16 | 33.4 | 0.3 |

Similar results are obtained with the other trialkyl benzenetriamines as defined herein. The trialkyl benzenetriamines having the same alkyl group in each of the 1, 3 and 5 positions are preferably employed, but mixed trialkyl benzenetriamines can be suitably employed and are readily prepared by reacting a mixture of amines with phloroglucinol. The antioxidants of this invention are also suitable for use in other petroleum derivatives such as fuel oils, lubricating oils, and the like, as well as such materials as vegetable oils, rubber, plastics, waxes, and similar materials which are normally subject to oxidation.

The invention thus provides a highly effective class of stabilizers which impart excellent oxidative stability to hydrocarbon compositions normally subject to objectionable amounts of oxidation. The materials embodying the invention are readily incorporated into the compositions to be stabilized and have no tendency to crystallize out of such compositions.

Although the invention has been described in detail with particular reference to certain preferred embodiments thereof, variations and modifications can be effected within the spirit and scope of the invention as described hereinabove and as defined in the appended claims.

We claim:

1. An antioxidant of the formula

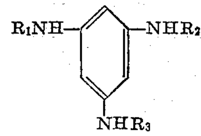

wherein $R_1$, $R_2$ and $R_3$ are the same alkyl groups of 1–8 carbon atoms.

2. An $N^1,N^3,N^5$ - tributyl - 1,3,5 - benzenetriamine free of other substituent groups.

3. $N^1,N^3,N^5$ - tris(n - butyl) - 1,3,5 - benzenetriamine.

4. $N^1,N^3,N^5$ - tris(sec-butyl) - 1,3,5 - benzenetriamine.

5. $N^1,N^3,N^5$ - tris(2 - ethylhexyl) - 1,3,5 - benzenetriamine.

6. $N^1,N^3,N^5$ - trimethyl - 1,3,5 - benzenetriamine.

7. Gasoline stabilized against oxidation with 0.001–1.0% by weight of an antioxidant of the formula

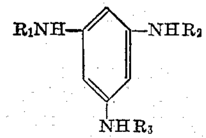

wherein $R_1$, $R_2$ and $R_3$ are the same alkyl groups of 1–8 carbon atoms.

8. Gasoline stabilized against oxidation with 0.001–1.0% by weight of $N^1,N^3,N^5$ - trimethyl - 1,3,5 - benzenetriamine.

9. Gasoline stabilized against oxidation with 0.001–1.0% by weight of $N^1,N^3,N^5$ - tris(n - butyl) - 1,3,5-benzenetriamine.

10. Gasoline stabilized against oxidation with 0.001–1.0% by weight of $N^1,N^3,N^5$ - tris(sec - butyl) - 1,3,5-benzenetriamine.

11. Gasoline stabilized against oxidation with 0.001–1.0% by weight of $N^1,N^3,N^5$ - tris(2 - ethylhexyl) - 1,3,5-benzenetriamine.

References Cited in the file of this patent

UNITED STATES PATENTS

| | | |
|---|---|---|
| 2,120,244 | Dryer | June 14, 1938 |
| 2,348,290 | Gilbert | May 9, 1944 |
| 2,381,015 | Von Bramer et al. | Aug. 7, 1945 |
| 2,395,382 | Walters | Feb. 19, 1946 |
| 2,671,807 | Prichard | Mar. 9, 1954 |
| 2,684,383 | Krueger | July 20, 1954 |